United States Patent [19]

Bracken, Jr. et al.

[11] 4,318,372

[45] Mar. 9, 1982

[54] ENGINE INTAKE MANIFOLD

[75] Inventors: Joseph W. Bracken, Jr., Redford; Edward E. Rahbe, Drayton Plains, both of Mich.

[73] Assignee: General Motors Corporation, Detroit, Mich.

[21] Appl. No.: 86,729

[22] Filed: Oct. 22, 1979

[51] Int. Cl.³ ............................................. F02B 75/18
[52] U.S. Cl. ............................. 123/52 M; 123/188 M
[58] Field of Search ............ 123/52 R, 52 M, 52 MC, 123/52 MV, 188 M

[56] References Cited

U.S. PATENT DOCUMENTS

| | | | |
|---|---|---|---|
| 1,613,995 | 1/1927 | Growe | 123/52 M |
| 2,640,470 | 6/1953 | Haltenberger | 123/52 M |
| 3,874,357 | 4/1975 | List et al. | 123/52 M |
| 3,945,349 | 3/1976 | Elsbett et al. | 123/52 M |
| 3,945,363 | 3/1976 | Elsbett et al. | 123/306 |
| 4,030,293 | 6/1977 | Hata | 123/52 M |
| 4,030,459 | 6/1977 | Hori et al. | 123/52 M |

*Primary Examiner*—Craig R. Feinberg
*Attorney, Agent, or Firm*—Robert J. Outland

[57] ABSTRACT

In a preferred embodiment, a log-type intake manifold for a diesel engine has a longitudinal passage with four equally spaced lateral outlet openings on one side and a centrally disposed inlet opening on the other side of the passage. Similar outlet flow conditions are created in the outlet passages by the addition of at least one flow directing vane at an outlet opening toward one end of the passage from the inlet to redirect the outlet gas flow into a pattern similar to that of the naturally occurring gas flow patterns at the outlet openings located toward the other end of the passage from the inlet.

2 Claims, 4 Drawing Figures

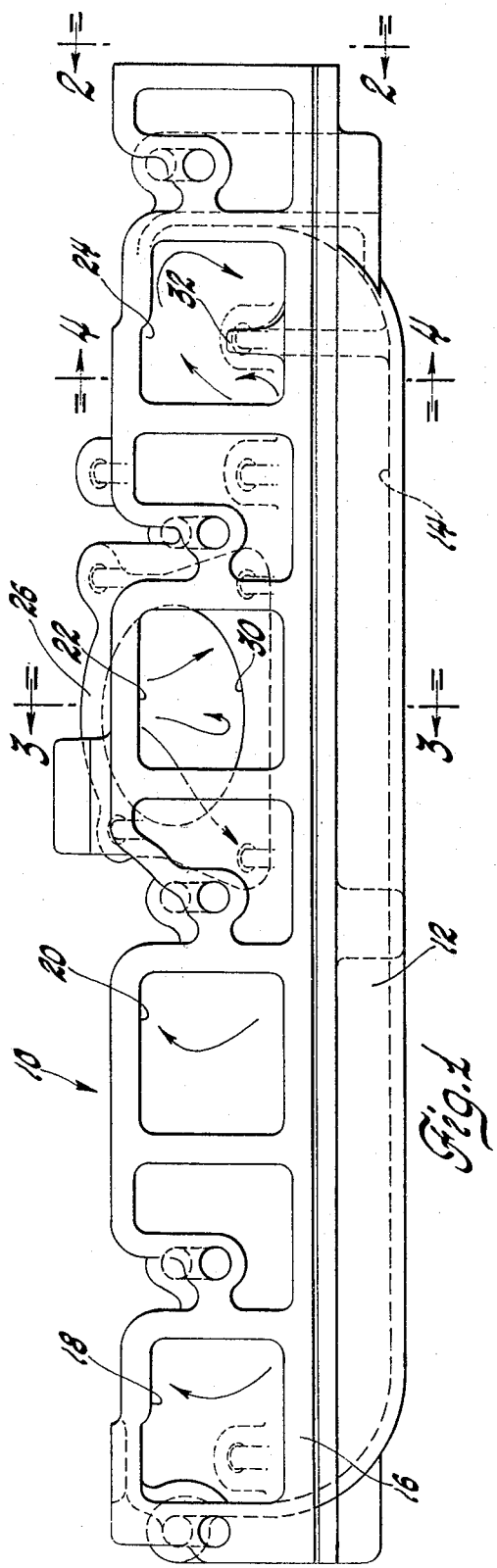
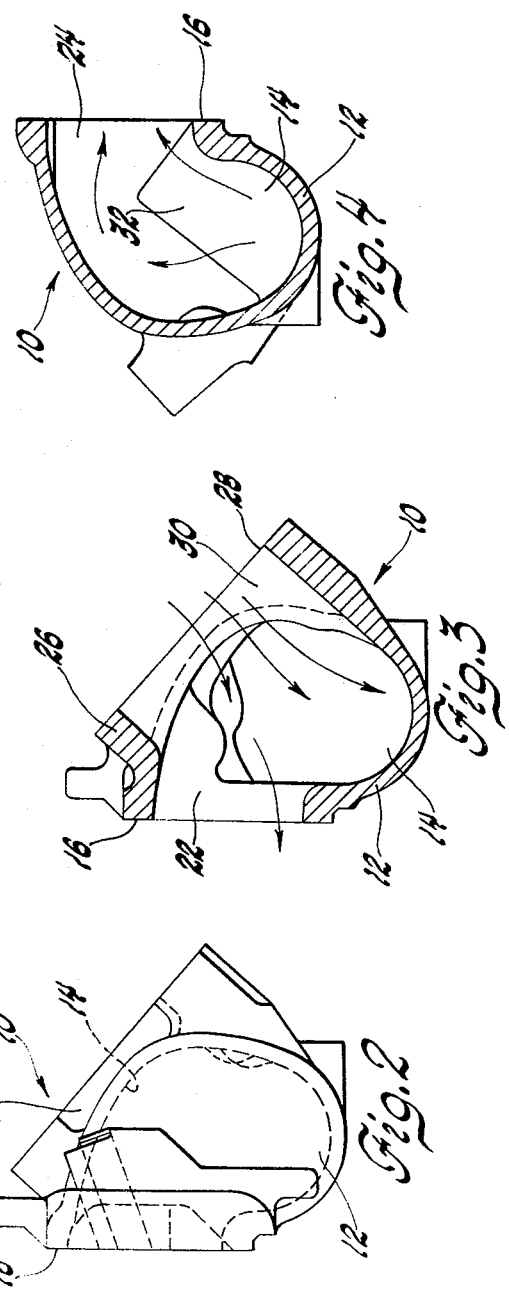

ENGINE INTAKE MANIFOLD

TECHNICAL FIELD

This invention relates to intake manifolds for internal combustion engines, especially diesel engines, having a plurality of cylinder air swirl developing inlet ports. In its more particular aspects, the invention relates to side feed log-type engine intake manifolds with internal flow directing means for balancing the inlet conditions for air flow to the associated engine cylinder inlet ports.

BACKGROUND OF THE INVENTION

In the art relating to diesel engines, it is known to provide each of the cylinders in an aligned bank of cylinders with a swirl forming inlet port, including a passage extending laterally inwardly from the side of an engine cylinder head to connect with a spiral passage opening to the engine cylinder. Engines with inlet ports of this general description are shown in the prior art, for example, in U.S. Pat. No. 3,273,551 Julien et al, U.S. Pat. No. 3,874,357 List et al, and U.S. Pat. No. 3,945,349 Elsbett et al.

It has been found through experience that in engines utilizing inlet ports of this general character, the amount of swirl developed in the engine cylinders may be affected favorably or adversely by flow conditions in the manifold or piping connected to supply air to the inlet ports. In this regard, it is noted that somewhat similar port inlet conditions are provided by the relatively long individual runners of the inlet piping of U.S. Pat. No. 3,945,349 Elsbett et al and by the end fed inlet manifolding shown in FIG. 18 of U.S. Pat. No. 3,874,357 List et al. In the arrangement of U.S. Pat. No. 3,273,551 Julien et al, the guide vane 60 on the floor of the port might have the effect of correcting somewhat for variable manifold air delivery conditions.

In practical engine embodiments, it is not always possible or desirable to utilize intake piping or manifolds having long individual inlet runners or end connections to a log-type manifold; nor is it necessarily desirable to include straightening vanes or other devices within the engine intake port to control inlet flow conditions. Thus, it is desired to provide a diesel type internal combustion engine having a plurality of aligned cylinder air swirl developing inlet ports, the swirl forming qualities of which are affected by inlet gas delivery conditions, with a compact intake manifold arrangement capable of providing air to the various ports under similar gas delivery conditions that do not adversely affect the port swirl developing qualities.

SUMMARY OF THE INVENTION

The present invention provides a log-type manifold of compact configuration usable with an internal combustion engine of the type described and having a lateral air inlet passage or opening disposed intermediate the manifold ends. The manifold includes a plurality of lateral outlets from the longitudinal passage or log, the inlet passage being spaced longitudinally intermediate the two furthest spaced outlet openings and located such that there is a tendency for diverse flow patterns to develop at the inlets to those furthest spaced outlet openings. This is corrected by introducing adjacent at least one of the outlet openings, a laterally directed vane disposed in a manner to redirect the gas flow from the adjacent outlet opening so as to provide a gas flow pattern to the associated engine cylinder inlet port which is sufficiently similar to that provided to the other inlet ports to avoid adversely affecting the swirl forming qualities of the associated engine inlet ports.

These and other features and advantages of the invention will be more fully understood from the following description of a preferred embodiment taken together with the accompanying drawing.

BRIEF DESCRIPTION OF THE DRAWING

In the drawing:

FIG. 1 is a view from the cylinder head mounting surface of an intake manifold eight-cylinder diesel engine and having flow correcting means in accordance with the invention;

FIG. 2 is a end view of the manifold as seen from the plane indicated by the line 2—2 of FIG. 1;

FIG. 3 is a cross-sectional view of the manifold as viewed in the direction of the arrows from the plane indicated by the line 3—3 of FIG. 1, and FIG. 4 is another cross-sectional view of the manifold as seen from the plane indicated by the line 4—4 of FIG. 1 looking in the direction of the arrows.

BEST MODE FOR CARRYING OUT THE INVENTION

In describing a preferred embodiment of the invention, it should first be mentioned that the manifold design illustrated is designed for use one on each bank of an eight-cylinder V-type diesel engine. The two manifolds are connected by a centrally disposed crossover conduit leading from a common air inlet. Within the engine cylinder heads are four longitudinally aligned longitudinally spaced swirl forming intake ports having approximately the form shown in FIG. 7 of U.S. Pat. No. 3,874,357 List et al but with the swirl orientation pictured for the inlet port of FIG. 2 in that same patent.

Referring now to the drawing in detail, numeral 10 generally indicates a preferred embodiment of intake manifold formed in accordance with the invention for the application previously indicated. Manifold 10 comprises an elongated hollow cast body 12 defining a longitudinally extending main gas passage or log 14. One side of the body is machined to provide a flat cylinder head engaging surface 16 which extends the full length of the body and is adapted to be sealingly secured against an inlet port opening surface of a cylinder head of the associated engine, not shown. First, second, third, and fourth longitudinally equally spaced outlet openings 18, 20, 22, 24 respectively, extend laterally through the surface 16 from spaced points along the main gas passage 14 and generally offset upwardly from the longitudinal center of the passage.

The intake manifold body is further provided with an inlet boss 26 extending upwardly at an angle with the direction of the outlet openings from a point intermediate the ends of the manifold body on the side generally opposite the intake openings and laterally opposite the third outlet opening 22. Boss 26 terminates in a machined surface 28 which, upon installation of the manifold on an engine, is normally horizontally disposed although shown inclined in the drawing. Boss 26 further defines an enlarged inlet opening 30 which opens through the surface 28 and connects with the main gas passage 14 at a point generally opposite the third outlet opening 22.

To accomplish the gas flow pattern controlling purpose of the instant manifold, a flow directing vane 32 is formed within the main gas passage. Vane 32 is mounted on the wall of the manifold and extends laterally inwardly therefrom in a zone beginning within the lower portion of the fourth outlet opening 24 and extending circumferentially for about one-third the circumference of the gas passage wall. The vane extends upwardly from the wall to a peak about half the height of the fourth outlet opening 24. Vane 32 is spaced longitudinally at a location about two-thirds of the distance from the side of the fourth outlet opening 24 nearest the adjacent end of the main gas passage. The specific shape and location of any flow directing vane in accordance with the invention are preferably determined through construction and flow testing of models of the actual manifold design in connection with the associated cylinder inlet ports in order that the most efficient design be arrived at to accomplish the desired swirl controlling purpose, as well as to provide balanced air flow to the engine cylinders.

In operation, as assembled on an associated engine, inlet air is delivered through the inlet opening 30 to the longitudinal passage or log 14 from which it passes at periodic intervals to each of the individual outlet openings 18, 20, 22, 24. Because of the near central location of the inlet opening, flow to the first and second outlet openings 18, 20 respectively, requires a longitudinal movement of the inlet air through the gas passage 14 in a leftward direction as viewed in FIG. 1 of the drawing. This is followed by a slightly upward changing to radially outward direction of flow which, it is thought, may impart a counter clockwise twisting motion in the direction of flow (clockwise as viewed in FIG. 1) to the air leaving the manifold inlet openings 18, 20, as generally indicated by the arrows associated therewith in the drawing. In a somewhat different manner, inlet air passage from the inlet opening 30 to the outlet opening 22 would appear to move in a downwardly and upwardly curving but generally lateral direction directly across the main gas passage 14 without imparting any significant swirling motion to the air leaving the third outlet port 22.

In still a different fashion, air moving from the inlet opening 30 to the fourth outlet opening 24 is required to flow in a longitudinal direction rightwardly as seen in FIG. 1 from the inlet opening 30 downwardly into the main passage 14. It then turns upwardly and radially outwardly into the outlet opening 24 so that, without the intervention of the flow directing vane 32 at this point, the described combination of flow conditions would apparently result in air leaving the outlet opening 24 with twist that is clockwise in the direction of flow, a sense directly opposite to that believed to occur in the first and second outlet openings 18, 20.

Whether or not this conjectural analysis of the resulting flow conditions is correct, tests of a model of a manifold constructed in the manner of the present invention, but without the flow directing vane, showed that the inlet conditions for the first, second, and third outlet openings 18, 20, 22 provided satisfactory swirl conditions in the engine cylinders upon passage of air through the associated swirl forming cylinder head inlet ports. These had a form as previously mentioned generally similar to the inlet port configuration of FIG. 7 with the direction sense of FIG. 2 of U.S. Pat. No. 3,874,357 List et al. On the contrary, the diverse flow pattern created in the fourth outlet opening 24 resulted in a substantially lower rate of swirl in the engine cylinder upon passage through the associated inlet port.

Thus, the diverse flow conditions of air delivered to the fourth outlet opening had an adverse effect upon the swirl forming qualities of the associated inlet port and to some extent negated the function of that port.

The difficulty encountered in these tests was overcome by addition of the flow directing vane 32 which satisfactorily modifies the direction of gas flow out of the fourth opening 24 so as to permit the development of a satisfactory amount of swirl upon passage of the gas through the associated cylinder inlet port. As indicated by the arrows in FIG. 1, it is conjectured that the effect of the flow directing vane 32 in the location described, is to deflect part of the gas flow from the lower portion of the main gas passage 14 upwardly and along the near edge of the outlet port 24. The remaining portion of the gas flow is directed over the vane and against the upper portion of the gas passage 14, turning downwardly as it moves into the outlet passage 24. Thus, the overall effect is believed to be the development in the outlet passage 24 of an overall counterclockwise twist in the direction of flow of gas passing out of the outlet passage, giving a twisting flow in a sense or direction similar to that in the first and second gas passages 18, 20. This, then, provides generally similar delivery conditions to the various inlet ports of the associated cylinder head.

While the invention has been described by reference to a particular preferred embodiment designed for application to a particular engine configuration, not illustrated, it should be understood that the inventive concepts described may assume differing forms in various other specific applications without departing from the basic concepts of the invention as taught herein. It is accordingly intended that the invention not be limited to the specific form illustrated, but that it have the full scope permitted by the language of the following claims.

The embodiments of the invention in which an exclusive property or privilege is claimed are defined as follows:

1. An intake manifold for use with an internal combustion engine having a plurality of aligned cylinder air swirl developing inlet ports, the swirl forming qualities of which are affected by inlet gas flow pattern delivery conditions, said manifold comprising an elongated hollow body defining a longitudinal gas passage, at least three outlet openings extending laterally from the passage in spaced longitudinal alignment through one side wall of said manifold, a single inlet opening connecting laterally with said passage through another side wall of the manifold at a point intermediate the two furthest spaced outlet openings and having only a single outlet opening in one end of the manifold adjacent the inlet opening such that diverse flow patterns are developed in the gas flow passage on opposite sides of said inlet opening, and a single flat flow directing vane positioned longitudinally with respect to said passage at said single outlet opening and extending laterally from the manifold side wall into the gas passage at said single outlet opening in a manner that cooperates with said single outlet opening on said one side of the inlet opening to provide a gas flow pattern in said single outlet opening similar to that provided in outlet openings on the other side of said inlet opening by the open manifold passage, whereby similar gas delivery conditions are provided to the associated cylinder inlet ports.

2. An intake manifold for use with an internal combustion engine having a plurality of aligned cylinder air swirl developing inlet ports, the swirl forming qualities of which are affected by inlet gas flow pattern delivery conditions, said manifold comprising an elongated hollow body defining a longitudinal gas passage, at least three outlet openings extending laterally and generally offset upwardly from the longitudinal center of the passage in spaced longitudinal alignment through one side wall of said manifold, a single inlet opening connecting laterally with said passage through another side wall of the manifold at a point opposite an intermediate one of said outlet openings and having only a single outlet opening in one end of the manifold adjacent the inlet opening such that diverse flow patterns are developed in the gas flow passage on opposite sides of said inlet opening, and a single flat flow directing vane positioned longitudinally with respect to said passage at said single outlet opening and extending laterally from the manifold side wall into the gas passage at said single outlet opening in a manner that cooperates with said single outlet opening on said one side of the inlet opening to provide a gas flow pattern in said single outlet opening similar to that provided in outlet openings on the other side of said inlet opening by the open manifold passage, whereby similar gas delivery conditions are provided to the associated cylinder inlet ports.

* * * * *